Unit ed States Patent [19]

Kolleck

[11] 4,082,531
[45] Apr. 4, 1978

[54] HOLDER FOR ROTATING GLASS BODY

[75] Inventor: Floyd W. Kolleck, Clarendon Hills, Ill.

[73] Assignee: The United States of America as represented by the United States Department of Energy, Washington, D.C.

[21] Appl. No.: 762,226

[22] Filed: Jan. 24, 1977

[51] Int. Cl.² .......................... C03B 23/04; C03B 9/40
[52] U.S. Cl. ........................................ 65/296; 65/297; 65/323; 65/375
[58] Field of Search ................... 65/17, 375, 299, 298, 65/296, 297, 323

[56] References Cited

U.S. PATENT DOCUMENTS

| 400,555 | 4/1889 | Everett | 65/323 X |
|---|---|---|---|
| 668,223 | 2/1901 | Rudolph | 65/296 X |
| 760,258 | 5/1904 | Scheidt | 65/297 |
| 3,416,344 | 12/1968 | Thielsch | 65/296 X |

Primary Examiner—Richard V. Fisher
Assistant Examiner—Frank W. Miga
Attorney, Agent, or Firm—Dean E. Carlson; Frank H. Jackson; Paul A. Gottlieb

[57] ABSTRACT

A device is provided for holding and centering a rotating glass body such as a rod or tube. The device includes a tubular tip holder which may be held in a lathe chuck. The device can utilize a variety of centering tips each adapted for a particular configuration, such as a glass O-ring joint or semi-ball joint.

6 Claims, 2 Drawing Figures

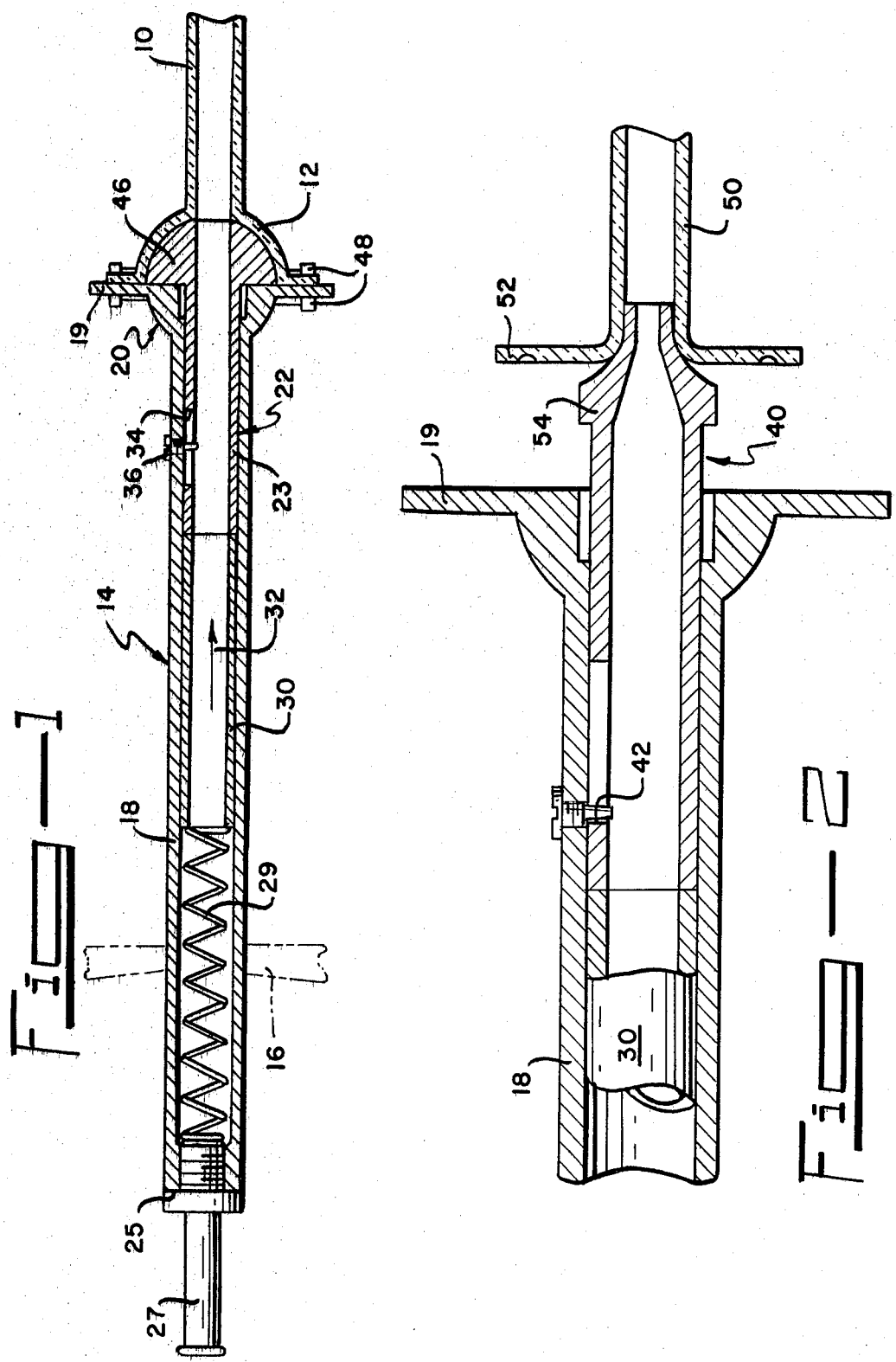

HOLDER FOR ROTATING GLASS BODY

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Lathes are utilized in glass working for a variety of functions such as flame sealing or glass blowing. The glass body is mounted on the lathe and rotated. The prior art practice has been to grasp with a lathe chuck the outer surface of the glass body. For example, where the glass body is a tube or rod, the piece is inserted into the chuck which clamps around the circumference of the object. This has proved not entirely satisfactory because the glass, being fragile, cannot be gripped tightly and thereby wobbling of the glass in the lathe chuck is common. This wobbling prevents centering in a precise manner and therefore accurate work becomes difficult.

It is therefore an object of this invention to provide a device for holding and centering a rotating glass body.

Another object of this invention is to provide a device for centering and holding a rotating glass body such as one having an O-ring joint or a semi-ball joint.

SUMMARY OF THE INVENTION

There is provided a device for holding a rotating glass body having an end of particular configuration such as being a mating piece. The device includes a tubular tip holder having a flange at one end. A centering tip, having a mating end adapted to receive the end of the glass body of a particular configuration, is fitted into the end of the tip holder with the flange. Forces exerted on the centering tip by a biasing spring tend to force the centering tip out of the tip holder. The glass body may be mounted on the tip holder by pushing the end of particular configuration against the mating end of the centering tip and then clamping the end of particular configuration onto the flange. Thus, the holder may be tightly gripped by a lathe chuck while, at the same time, centering the glass body in the lathe.

DESCRIPTION OF THE DRAWINGS

FIG. 1 is a cross section of one embodiment of the device for holding a rotating glass body; and FIG. 2 shows a portion of the holder utilizing another embodiment of centering tip.

DETAILED DESCRIPTION OF THE PREFERRED EMBODIMENT

Referring to FIG. 1 there is shown a device for holding and centering a rotating glass body such as a glass tube 10. Rotation is utilized in a glass-working lathe for operations such as flame sealing or glass blowing. In the embodiment shown in FIG. 1, the end 12 of tube 10 is fitted with a socket joint. The prior art technique for holding such a glass rod or tube was to clamp the lathe chuck directly about the mating piece of the glass tube 10. Because of the fragile nature of the glass, the grip force is limited and wobbling can occur, making centering difficult.

In FIG. 1 there is shown a unique holder 14 which holds and centers glass body 10. The holder 14, which may be made of considerably stronger structural material than glass, such as aluminum, is gripped by the jaws 16 of the lathe chuck (not shown). The holder 14 includes a tip holder 18 in the form of a metal tube. Tip holder 18 has a flange 19 at one end 20 and is adapted to receive at end 20 a variety of centering tips 22. Each centering tip 22 is shaped so that its main body portion 23 slides into the opening of tip holder 18 at end 20.

The other end 25 of tip holder 18 has a stop 27 provided. In the embodiment of FIG. 1 the stop is in the form of an air hose connection fitting screwed into end 25. This type of fitting would be utilized in a glass blowing operation. For other operations a closed cap might fit into end 25. In any event, a spring 29 and a filler tube 30 are contained within tip holder 18. Filler 30 is provided merely to take up space between centering tip 22 and spring 29 so that spring 29 can exert force against stop 25 towards and onto centering tip 22, tending to force tip 22 in the direction of arrow 32.

Centering tip 22 is provided with a slot 34. Screw or pin 36 extends through the side of tip holder 18 into slot 34 of tip 22. Thus, the combination of pin 36 and slot 34 acts as a stop limiting the biasing impetus of spring 29 acting on centering tip 22. This is better illustrated in the embodiment shown in FIG. 2, where centering tip 40 is biased by the force of spring 29 acting on filler tube 30 so that slot 42 of centering tip 40 is in contact with pin 36. This stop provided by pin 36 facilitates mounting of glass tube 10 on holder 14 by preventing centering tip 22 from popping out of tip holder 18 prior to assembly.

Glass body 10 is mounted on holder 14 in the following manner. Where body 10 has a ball joint 12 at one end, the centering tip 22 is chosen which has a compatible mating end 46. For use with the ball joint 12, such a mating end 46 would ideally be in the form of a semisphere of equal radius to the radius of the convex socket joint 12. Socket joint 12 is forced against mating end 46 and flange 19 by a biasing means such as a pinch clamp 48. The biasing of spring 29 forces mating end 46 to snugly fit socket joint 12 while the force of pinch clamp 48 on flange 19 and joint 12 centers socket joint 12 on mating end 46 and against flange 19. Thus, when holder 14 is solidly gripped by chuck jaws 16, glass body 10 is both centered in the lathe chuck and rigidly held in the centered position.

Referring to FIG. 2, there is shown a further embodiment illustrating the adaptive nature of holder 14 to different glass body shapes. Here glass body 50 has at one end an O-ring joint 52. To hold such a glass body, the device of FIG. 1 is modified by simply replacing centering tip 22 with another centering tip 40 whose mating end 54 is adaptable to O-rings. This is done by removing pin 36 from slot 34, removing centering tip 22 from end 20, inserting centering tip 40, and inserting pin 36 in slot 42. In FIG. 2, glass body 50 with O-ring flange 52 is being pressed against mating end 54 in preparation for assembly but pinch clamp 48 has not yet been utilized. When utilized, the pinch clamp will force the O-ring joint flange 52 against flange 19 while the spring biasing of centering tip 40 will force mating end 54 through the center of joint 52, thereby centering the glass body 50. The particular adaptive surface for the O-ring mating piece is the tapered end 54, as shown in FIG. 2.

For other types of glass body shapes, the appropriate mating end may be selected so that a glass body may be forced against flange 19 while the force of spring 29 tends to center the glass object as desired. Various sizes of centering tips may be utilized with a particular tip holder 18. Also there may be provided tip holders of varying sizes with appropriately matched centering tips. Although this disclosure has referred mainly to glass tubing, any glass object either hollow or solid may be utilized provided it includes an appropriate mating end such as an O-ring or ball joint with a hole or depression in the center of the mating end sufficient to allow the centering tip to center the glass body.

The embodiments of the invention in which an exclusive property or privilege is claimed are defined as follows:

1. A device for holding a glass body wherein the glass body has a symmetric concave end of particular configuration, comprising:
    a tubular tip holder having a flange at one end thereof, a centering tip positioned in said one end of said tip holder capable of sliding into and out of said one end of said tubular holder, said tip having an end projecting from said holder of specific shape,
    means capable of clamping the concave end of the body against said flange and spring means within said tip holder for biasing said tip out said one end of said holder, said specific shape of said one end of said centering tip being matable with the concave end of the body such that with the concave end of the body clamped against said flange and said spring means thereby biasing said centering tip against the concave end of the body said tip exerts an axial force on the body opposing the force exerted on the body by said means for clamping thereby centering the concave end on the device.

2. The device of claim 1 wherein said centering tip includes an axial slot and further including a pin extending through the side of said tip holder into said slot thereby acting as a stop against the biasing of said spring means preventing ejection of said centering tip from said tip holder.

3. The device of claim 2 wherein the end of particular configuration is an O-ring joint with a hole in the center and wherein said projection of said centering tip is conical in shape so that with said O-ring clamped to said flange said projection is biased by said spring means into said hole thereby centering said O-ring joint.

4. The device of claim 3, wherein said tip holder and said centering tip have hollow centers to allow air to be blown therethrough into said glass body.

5. The device of claim 2 wherein the end of particular configuration is a socket of a ball joint and wherein said projection of said centering tip is semispherical in shape projection is biased by said spring means against said socket thereby centering said socket.

6. The device of claim 5, wherein said tip holder and said centering tip have hollow centers to allow air to be blown therethrough into said glass body.

* * * * *